US009953552B2

(12) United States Patent
Yuan et al.

(10) Patent No.: US 9,953,552 B2
(45) Date of Patent: Apr. 24, 2018

(54) LED DISPLAY UNIT BOARD, LED DISPLAY SCREEN CONTROL CARD AND LED DISPLAY SCREEN SYSTEM

(71) Applicant: Xi'an NovaStar Tech Co., Ltd., Xi'an (CN)

(72) Inventors: Shengchun Yuan, Xi'an (CN); Jingguo Zong, Xi'an (CN); Huorong Wang, Xi'an (CN); Guanghui Fan, Xi'an (CN)

(73) Assignee: XI'AN NOVASTAR TECH CO., LTD., Xi'an (CN)

( * ) Notice: Subject to any disclaimer, the term of this patent is extended or adjusted under 35 U.S.C. 154(b) by 179 days.

(21) Appl. No.: 14/414,881

(22) PCT Filed: Mar. 10, 2014

(86) PCT No.: PCT/CN2014/073102
§ 371 (c)(1),
(2) Date: Jan. 14, 2015

(87) PCT Pub. No.: WO2015/043139
PCT Pub. Date: Apr. 2, 2015

(65) Prior Publication Data

US 2016/0275835 A1 Sep. 22, 2016

(30) Foreign Application Priority Data

Sep. 26, 2013 (CN) .......................... 2013 1 0445544
Sep. 26, 2013 (CN) .......................... 2013 1 0446042
Sep. 26, 2013 (CN) .......................... 2013 1 0446064

(51) Int. Cl.
*G06F 13/14* (2006.01)
*G09G 3/00* (2006.01)
(Continued)

(52) U.S. Cl.
CPC ............... *G09G 3/006* (2013.01); *G09F 9/33* (2013.01); *G09F 13/005* (2013.01); *G09F 13/22* (2013.01);
(Continued)

(58) Field of Classification Search
CPC .......... G09G 3/006; G09G 5/006; G09G 5/10; G09G 2310/0264; G09G 2320/04;
(Continued)

(56) References Cited

U.S. PATENT DOCUMENTS 5,410,328 A * 4/1995 Yoksza ..................... G09F 9/33 345/82
2010/0049454 A1* 2/2010 Irissou ............... H05B 33/0893 702/58
(Continued)

FOREIGN PATENT DOCUMENTS

CN 201556400 U * 8/2010
CN 203165413 U * 8/2013

*Primary Examiner* — Xiao Wu
*Assistant Examiner* — Sarah Lhymn
(74) *Attorney, Agent, or Firm* — Ding Yu Tan

(57) ABSTRACT

The present invention provides a LED display unit board, a LED display screen control card and a LED display screen system. In the LED display screen control card, an output circuit transmits data and control signals to an input-output interface to drive and control a LED display unit board(s); a data return circuit transmits return data generated from the LED display unit board(s) which represents a test result of the LED display unit board(s) to a main control circuit. The present invention disposes the data return circuit on the control card which can be used together with the LED display unit board(s) each having a data return circuit. Therefore there is no need of an additional monitoring board
(Continued)

for building a circuit loop to perform fault detection of the LED display unit board(s), simplified connection and lower cost can be achieved.

10 Claims, 6 Drawing Sheets

(51) Int. Cl.

| | |
|---|---|
| ***G09F 9/33*** | (2006.01) |
| ***G09G 3/32*** | (2016.01) |
| ***G09F 13/00*** | (2006.01) |
| ***G09F 13/22*** | (2006.01) |
| ***G09G 5/00*** | (2006.01) |
| ***G09G 5/10*** | (2006.01) |

(52) U.S. Cl.
CPC ............... *G09G 3/32* (2013.01); *G09G 5/006* (2013.01); *G09G 5/10* (2013.01); *G09F 2013/222* (2013.01); *G09G 2300/026* (2013.01); *G09G 2310/0264* (2013.01); *G09G 2320/04* (2013.01); *G09G 2330/10* (2013.01); *G09G 2330/12* (2013.01); *G09G 2370/00* (2013.01)

(58) Field of Classification Search
CPC ............ G09G 2330/12; G09G 2370/00; G09F 13/005; G09F 13/22; G09F 2013/222
USPC ......................................... 345/501, 519, 520
See application file for complete search history.

(56) References Cited

U.S. PATENT DOCUMENTS

| | | | | |
|---|---|---|---|---|
| 2012/0074863 | A1* | 3/2012 | Shimomura ....... | H05B 37/0245 315/246 |
| 2012/0327129 | A1* | 12/2012 | Li ............................ | G09G 3/32 345/690 |
| 2013/0082624 | A1* | 4/2013 | Brassfield .......... | H05B 33/0818 315/297 |

* cited by examiner

LED DISPLAY UNIT BOARD, LED DISPLAY SCREEN CONTROL CARD AND LED DISPLAY SCREEN SYSTEM

FIELD OF THE INVENTION

The present invention relates to the field of display technology, and more particularly to a LED display unit board, a LED display screen control card and a LED display screen system.

BACKGROUND OF THE INVENTION

The LED display screen system as a new type of display technology is gradually accepted by the market owing to its advantages such as energy saving, environmental protection, higher brightness and so on, and thus it is widely used in urban media and city traffic applications.

The LED display screen system in the traffic application field is usually used to display messages such as names of road, road conditions and speed limits. However, any one LED of a LED display screen may go bad or dead, and when the number of bad/dead LEDs is too large or an area of the LED display screen has too many bad LEDs, the display of messages would be negatively influenced, and even to having the LED display screen displaying wrong messages. Therefore, how to make the LED display screen system in the traffic application field to detect LEDs fault/error in time is one of the problems emergently to be solved.

The fault detection in a LED display screen system of prior art is carried out by forming a circuit loop constituted by a receiving card, LED display unit boards and a monitoring board/card, more details can refer to the Chinese utility patent application submitted by the same applicant of the present invention on Jun. 25, 2012. The application number of the Chinese utility patent application is CN2012102110656.7, and the title of the Chinese utility patent application is "state detecting apparatus and detecting method of LED display screen". The receiving card outputs data and control signals to the LED display unit boards. The LED display unit boards each include an input interface and an output interface, and transmit data signals to the next stage LED display unit board thereof. The output interface of the last stage LED display unit board is electrically connected to the monitoring board. The monitoring board/card receives the data outputted from the last stage LED display unit board and processes the received data, and then transmits/delivers the processed data to the receiving card. The receiving card analyzes received data and hereby obtains a LED fault condition of the LED display screen.

However, the prior art LED display screen system has the following disadvantages: (1) a LED box equipped with the LED display unit board(s) therein has excessive number of connection cables and thus is complicated; (2) the additional monitoring board is needed and thus the cost is higher. Accordingly, it is necessary to provide a LED fault detection solution with simplified connection and reduced cost.

SUMMARY OF THE INVENTION

Therefore, the present invention provides a LED display unit board, a LED display screen control card and a LED display screen system, so as to achieve a LED fault detection with simplified connection and low cost.

Specifically, an embodiment of the present invention provides a LED display unit board, the LED display unit board includes a circuit board and a plurality of LED pixel disposed on the circuit board. In addition, the LED display unit board further includes a first input-output interface, a LED driving circuit and a data return circuit. The first input-output interface is disposed on the circuit board. The LED driving is disposed on the circuit board and electrically connected to the first input-output interface to receive external data and control signals to thereby drive and control the plurality of LED pixels and generate return data representing a test result (i.e., generally fault detection result) of the LED display unit board. The data return circuit is disposed on the circuit board and electrically connected to the first input-output interface to transmit the return data to the first input-output interface.

Moreover, another embodiment of the present invention provides a LED display screen control card adapted for driving a LED display unit board string. The LED display unit board string includes one LED display unit board or a plurality of LED display unit boards connected in cascade. Specifically, the LED display screen control card includes a main control circuit, an input-output interface, an output circuit and a data return circuit. The input-output interface is adapted for being electrically connected to the LED display unit board string. The output circuit is electrically connected between the main control circuit and the input-output interface and configured (i.e., structured and arranged) to transmit data and control signals provided by the main control circuit to the input-output interface to thereby drive and control the LED display unit board string. The data return circuit is electrically connected between the main control circuit and the input-output interface and configured to receive return data generated from the LED display unit board string and transmitted to the input-output interface and then transmit the return data to the main control circuit. The return data represents a test result (fault detection result) of the LED display unit board string.

In addition, still another embodiment of the present invention provides a LED display screen system. The LED display screen system includes a main control card, a LED display unit board and a terminal connection module. A LED display unit board string is electrically connected to the LED display screen control card, and includes one LED display unit board or a plurality of LED display unit boards connected in cascade. The terminal connection module is electrically connected to the last stage LED display unit board of the LED display unit board string and is configured to make return data which represent a test result (fault detection result) of the LED display unit board string be returned to the LED display unit board string through the terminal connection module and then be transmitted to the LED display screen control card. The return data are generated by the LED display unit board string.

In the above various embodiments of the present invention, by disposing a data return circuit on the LED display screen control card, the LED display screen control card can be used together with a LED display unit board(s) each having a data return circuit, so there is no need to set the additional monitoring board like the prior art for building a circuit loop to perform the fault detection of the LED display unit board(s) of the LED display screen, the connection is simplified and the cost is lowered.

The above description is only an overview of the technical solutions of the present invention, and in order to more clearly understand technical means of the present invention and then can be implemented in accordance with contents of the specification, and in order to make the aforementioned and other objectives, features and advantages be more comprehensible, preferred embodiments will be described below in detail with reference to accompanying drawings.

DETAILED DESCRIPTION OF PREFERRING EMBODIMENTS

In order to further illustrate the technical means adopted for achieving the intended purpose of the present invention and effects thereof, specific implementations, methods, processes and effects of a LED display unit board, a LED display screen control card and a LED display screen system provided by the present invention will be described below in detail in preferred embodiments with reference to the accompanying drawings.

The foregoing and other related technical contents, features and effects of the present invention will be clearly described in detail below in the description of preferred embodiments with reference to accompanying drawings. By the illustration of specific embodiments, the technical means adopted for achieving the intended purpose and the effects thereof of the present invention can be comprehensively understood. However, the accompanying drawings are used for reference and description only, and not used to restrict the present invention.

Figure 1:
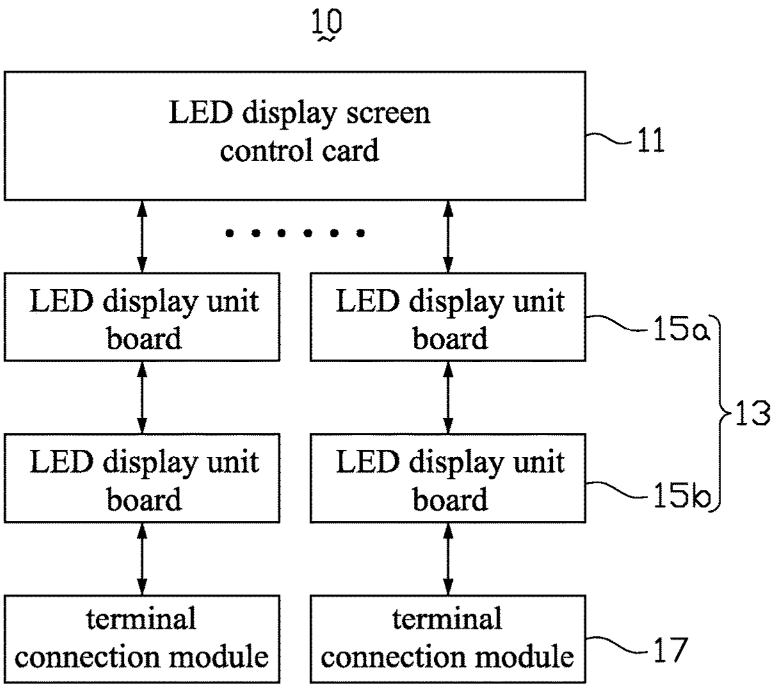
FIG. 1 is a schematic view of architecture of a LED display screen system of an embodiment of the present invention.

FIG. 1 is a schematic view of architecture of a LED display screen system of an embodiment of the present invention. Referring to FIG. 1, the LED display screen system includes a LED display screen control card 11, multiple (i.e., more than one) LED display unit board strings 13, and multiple terminal connection modules 17. Each LED display unit board string 13 includes, for example, two LED display unit boards 15*a*, 15*b*, and is configured to be electrically connected in cascade configuration to the LED display screen control card 11. Each of the LED display unit board string 13 is configured with one terminal connection module 17. It should be noted that, the LED display unit board 15*a*, 15*b* may have a same circuit structure, and the use of different numerical references only is used to indicate that the LED display unit board 15*a*, 15*b* are at different positions of the LED display unit board string 13. In addition, the number/amount of the LED display unit board strings 13 is not limited to two, as shown in FIG. 1, and can be adjusted and determined by the size of actual LED display screen. The number of the LED display unit board 15*a*, 15*b* of each of the LED display unit board string 13 is not limited to two as shown in FIG. 1, but (instead) it can be just one, for example, only one LED display unit board 15*b*, or more than two, for example, of including multiple number of LED display unit boards 15*a* and one LED display unit board 15*b*. Moreover, the terminal connection module 17 may be a circuit module independent/separated from the LED display unit board, or directly formed on the last stage LED display unit board 15*b*. It should be noted that, if the LED display unit board string only includes one LED display unit board, the last stage LED display unit board and the first stage LED display unit board is the same one LED display unit board.

Figure 2:
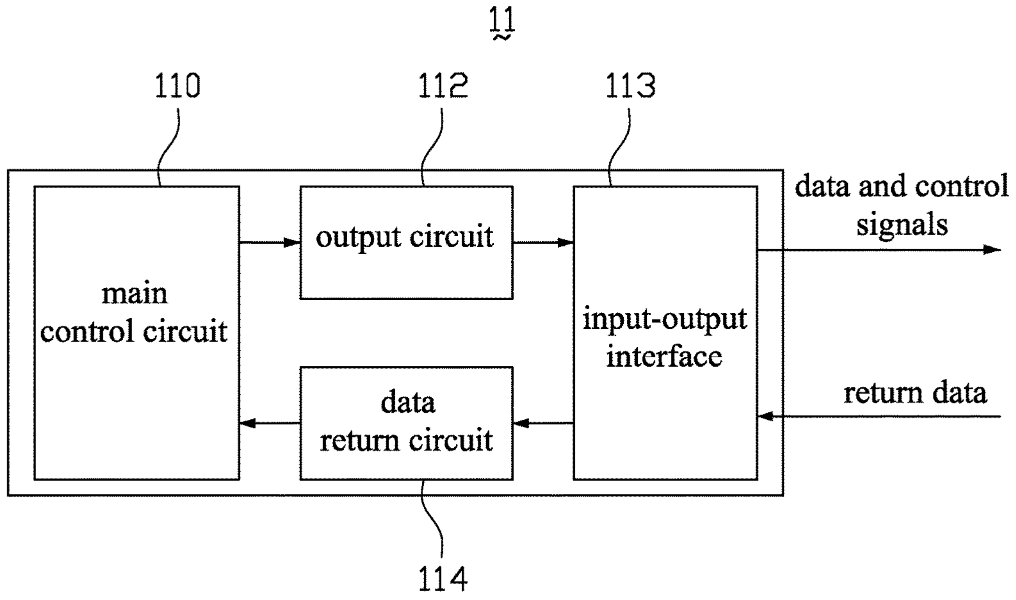
FIG. 2 is a schematic circuit block diagram of a LED display screen control card as shown in FIG. 1.

Referring to FIGS. 1 and 2 together, FIG. 2 is a schematic circuit block diagram of the LED display screen control card 11 as shown in FIG. 1. As shown in FIG. 2, the LED display screen control card 11 mainly includes a main control circuit 110, an output circuit 112, a data return circuit 114 and an input-output interface 113. Of course, the LED display screen control card 11 may also include some necessary auxiliary circuits, such as, volatile memory and/or non-volatile memory, which are not repeated herein. In addition, the LED display screen control card 11, for example, is designed with two circuit boards, in which the main control circuit 110 is disposed on a bottom circuit board, while the output circuit 112, the data return circuit 114 and the input-output interface 113 are disposed on a top circuit board. Herein, the top circuit board is mainly used for interface extension, and can be fixed to the bottom circuit board through the fixedly engagement of a pin header with a pin socket.

Moreover, the main control circuit 110, for example, includes a programmable logic device such as FPGA (Field Programmable Gate Array), or CPLD (Complex Programmable Logic Device), and so on. The main control circuit 110 can perform data conversion and gray scale control so as to provide display data and control signals to the output circuit 112. The output circuit 112 then transmits the display data and control signals to the LED display unit boards 15*a*, 15*b* through the input-output interface 113. Herein, the display data and control signals received by the LED display unit board 15*b* are delivered from the preceding stage LED display unit board 15*a* connected with the LED display unit board 15*b* in cascade. It is understood that the programmable logic device of the main control circuit 110 can be replaced by an embedded microprocessor such as ARM, MCU (Microcontroller Unit) and so on. Or, the main control circuit 110 includes a combination of the programmable logic device and the embedded microprocessor, and the programmable logic device and the embedded microprocessor may be disposed on the same circuit board or on different circuit boards respectively, so that the embedded microprocessor can be responsible for processing display content to form display content data and control signals such as clock signals, synchronization signals and so on, and then supplying the display content data and control signals to the programmable logic device for use; and the programmable logic device can be responsible for data conversion and gray scale control to thereby provide display data and control signals to the LED display unit boards 15*a*, 15*b*. The output circuit 112 is electrically connected between the main control circuit 110 and the input-output interface 113, and configured to output data and control signals such as R (red), G (green), B (blue) display data signal, an enable signal, data latch signals, shift clock signals, and control signals to the input-output interface 113. The data return circuit 114 is electrically connected between the main control circuit 110 and the input-output interface 113, and is configured to receive a return data inputted from the input-output interface 113 and then transmit the return data to the main control circuit 110. Herein, the data return circuit 114 is, for example, a driver chip (such as 74HC245 chip, etc.) for signal enhancement, or a discrete component circuit, or a connection line(s). In addition, it is known from the above description of the LED display control card 11 that: the input-output interface 113 can be divided into three parts, namely, an output data interface, a control signal interface and a return data interface. The three parts of the input-output interface 113 can be an integrally-formed structure, i.e., a single structure. The output data interface is used as an output port of the display data signals such as R, G, B, etc., the return data interface is used as an input port of the return data representing the test result of R, G, B three-color LEDs. it is understood that the embodiment of the display data signals being as R, G, B three-color LEDs data is corresponding to the LED display unit boards 15*a*, 15*b* each being provided with R, G, B three-color LEDs, but the present invention is not limited to this configuration/embodiment, the LED display unit boards 15*a*, 15*b* each may be provided only with R, G two-color LEDs, or may be provided with four-color LEDs, or may be provided with only a monochromatic LED in other embodiments.

Figure 3A:
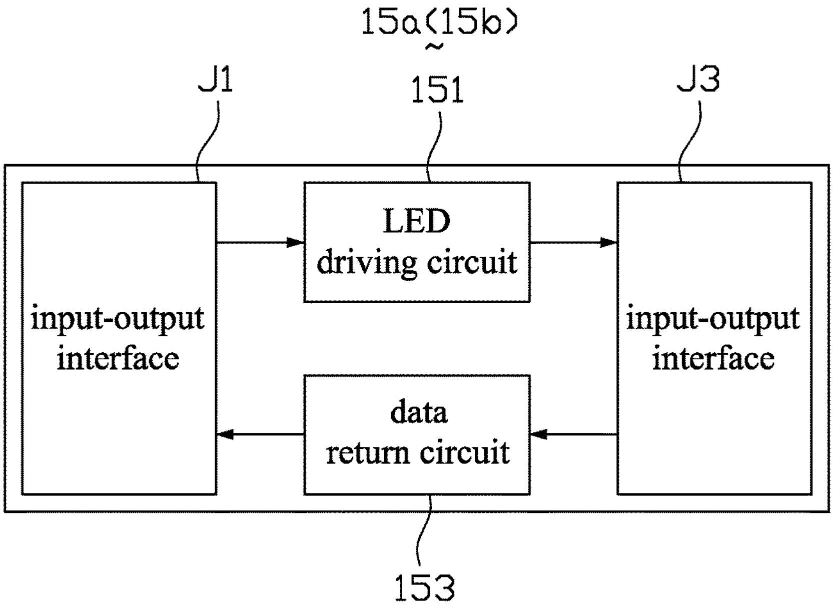
FIG. 3A is a schematic circuit block diagram of each LED display unit board as shown in FIG. 1.
Figure 3B:
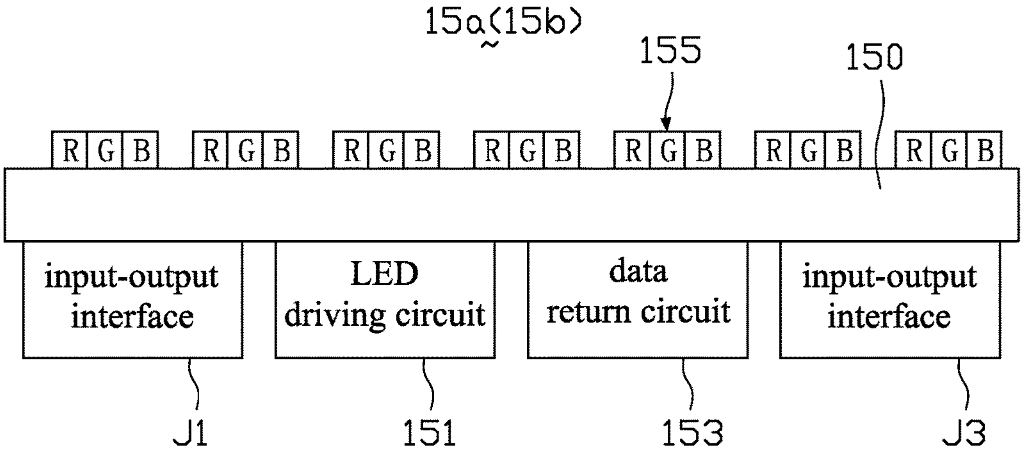
FIG. 3B is a schematic structural view of each LED display unit board as shown in FIG. 1.

FIGS. 3A and 3B respectively are a schematic circuit diagram and a schematic structural view of the LED display unit boards 15*a* (15*b*) as shown in FIG. 1. As shown in FIGS. 3A and 3B, the LED display unit board 15*a* (15*b*) includes an input-output interface J1, a LED driving circuit 151, an another input-output interface J3 and a data return circuit 153, which all are disposed on a circuit board 150 besides a plurality of LED pixels 155 disposed on the circuit board 150. The LED driving circuit 151 is electrically connected between the input-output interface J1 and the another input-output interface J3, and is used to drive and control the plurality of LED pixels disposed on the LED display unit board 15*a* (15*b*) to be illuminated or not illuminated according to control signals and display data signals belonging to the LED display unit board inputted through the input-output interface J1, and the display data signals being not belonging to it is transmitted/delivered to the next stage LED display unit board which is connected with thereof in cascade through the input-output interface J3. In this embodiment, a single LED pixel includes one or more colored LEDs. The LED driving circuit 151 supports fault detection mode, and for example, includes a driver chip supporting spot check such as MB15036, MB15034, MBI5040, DM13H, MBI5030 and other LED driver chips. In this case, when the LED display screen control card 11 enables the LED driving circuit 151 to perform spot check on a plurality of LEDs driven and controlled by the LED driving circuit 151, and the LED driving circuit 151 operates in a fault detection mode, the LED driving circuit 151 drives and controls the LEDs according to the display data used for fault detection and received from the LED display screen control card 11, and outputs a return data representing the test result of the LEDs. The return data subsequently will be sent to the LED display screen control card 11 for analyzing whether the LED display unit board 15*a* (15*b*) has one or more bad LED(s) and also the determine the location/position of the one or more bad LED(s).

The data return circuit 153 is electrically connected between the input-output interface J1 and the another input-output interface J3, and is used to transmit the return data inputted from the input-output interface J3 to the input-output interface J1. In this embodiment, the data return circuit 153 is for example a driver chip (such as 74HC245 chip, etc.) for signal enhancement, or a discrete component circuit, or a connection line(s). Furthermore, as seen from the above description of the LED display unit board 15*a* (15*b*), the input-output interface J1 can be divided into an input data interface, a control signal interface and a data return interfaces, and the another input-output interface J3 can be divided into an output data interface, a control signal interface and a data return interface. The input data interface of the input-output interface J1, the LED driving circuit 151 and the output data interface of the another input-output interface J3 together constitute a data generation path segment. The return data interface of the input-output interface J3, the data return circuit 153 and the return data interface of the input-output interface J1 together constitute a data return path segment. Therefore, the data generation path segment can generate and output return data representing a test result of the LEDs of the LED display unit board 15*a* (15*b*) under the control of the LED display screen control card 11, the return data then can be transmitted to the LED display screen control card 11 via the data return path segment for analyzing as to whether the LED display unit board 15*a* (15*b*) has one or more bad LED(s) and locate the position for the one or more bad LED(s). It can be understood according to the above description that, the data generation path is a forward transmission path while the data return path is a backward transmission path.

Figure 4:
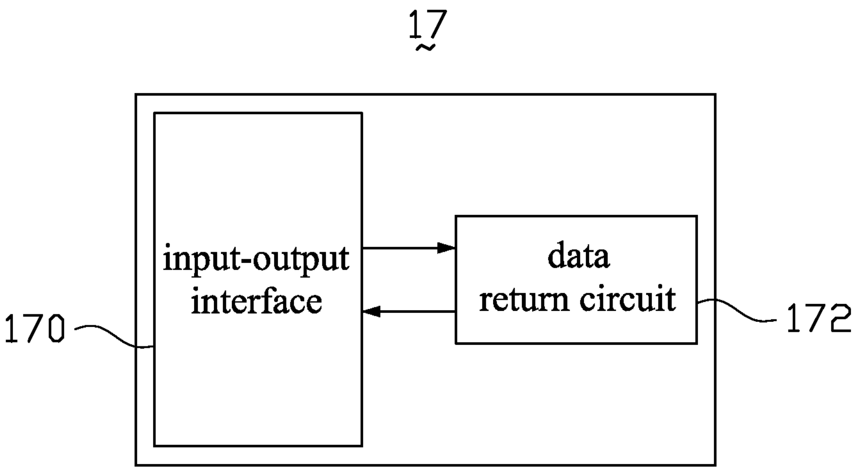
FIG. 4 is a schematic circuit block diagram of a terminal connection module as shown in FIG. 1.

FIG. 4 is a schematic circuit block diagram of the terminal connection module 17 as shown in FIG. 1. As shown in FIG. 4, the terminal connection module 17 includes an input-output interface 170 and a data return circuit 172. The data return circuit 172 is electrically connected to the input-output interface 170, and for example, is configured to receive the return data which are inputted from the input-output interface 170 and represent the test result (e.g., spot checking result) of the LEDs of the LED display unit boards 15*a*, 15*b* and transmit the return data to the input-output interface 170 for output. Thus, the input-output interface 170 can be divided into an input data interface and an output data interface. The data return circuit 172 is, for example, a driver chip (such as 74HC245 chip, etc.) for signal enhancement, or a discrete component circuit, or a connection line(s).

As seen from FIGS. 1, 2, 3A and 4, the input-output interface J1 of the LED display unit board 15*a* may be electrically connected with the input-output interface 113 of the LED display screen control card 11 via a ribbon cable, the input-output interface J1 of the LED display unit board 15*b* may be electrically connected to the input-output interface J3 of the LED display unit board 15*a* via a ribbon cable, and the input-output interface 170 of the terminal connection module 17 may be electrically connected to the input-output interface J3 of the LED display unit board 15*b* through a ribbon cable or snapped together with the input-output interface J3 of the LED display unit board 15*b* by the engagement of a pin header with a pin socket.

Figure 7:
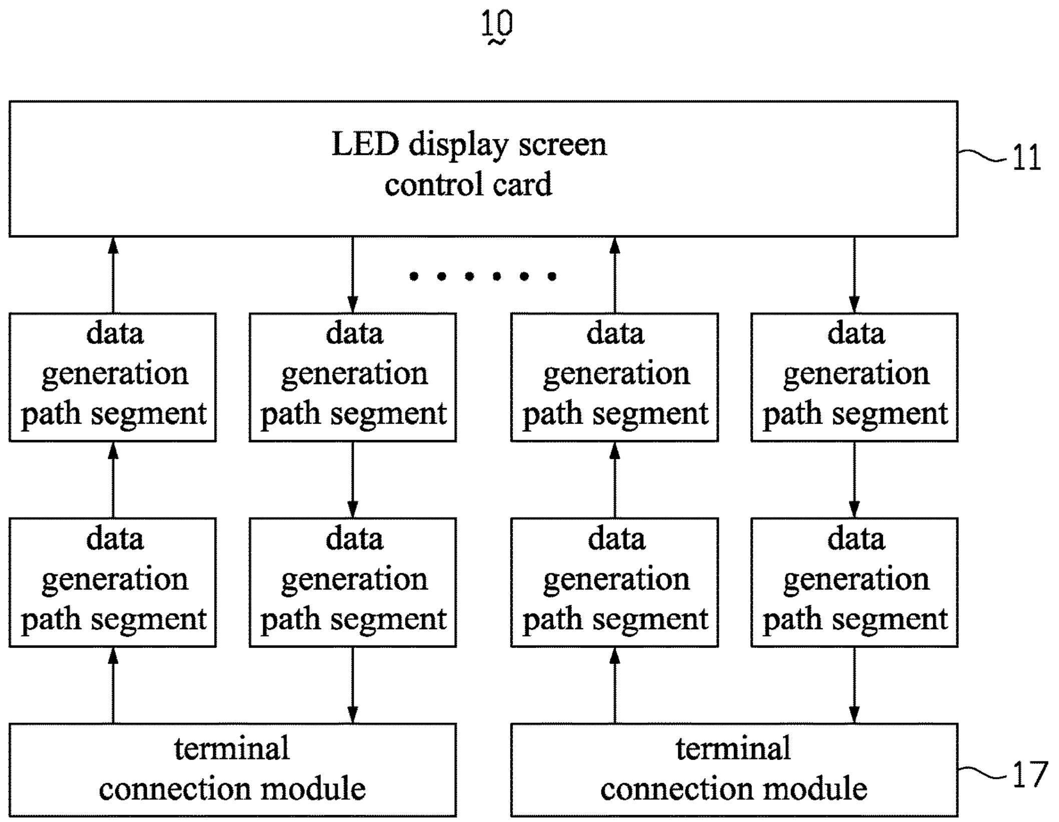
FIG. 7 is a schematic view of architecture of the LED display screen system as shown in FIG. 1 from another viewpoint.

Please refer to FIGS. 7, 1 and 2 seen together from another viewpoint, as to each LED display unit board string 13 constituted by the two LED display unit boards 15*a*, 15*b* as shown in FIG. 1, the data generation path segments of the LED display unit boards 15*a*, 15*b* are electrically connected in series to form a data generation path, and the data return segments of the LED display unit boards 15*a*, 15*b* are electrically connected in series to form a data return path. Herein, the data generation path segment and the data return path segment of the same LED display unit board are formed on the same circuit board, and the circuit board is provided with a plurality of LEDs. The data generation path and the data return path are individually electrically connected to the input-output interface 113 of the LED display screen control card 11 and further are electrically connected with each other together by the terminal connection module 17, so that the return data which represent a test result of the LEDs of the display unit boards 15*a*, 15*b* and are generated from the data generation path can be transmitted sequentially through the terminal connection module 17 and the data return path to the LED display screen control card 11 for analyzing and determining of whether the LED display unit boards 15*a* (15*b*) each has one or more bad LED(s) and of the position of the one or more bad LED(s).

Figure 5:
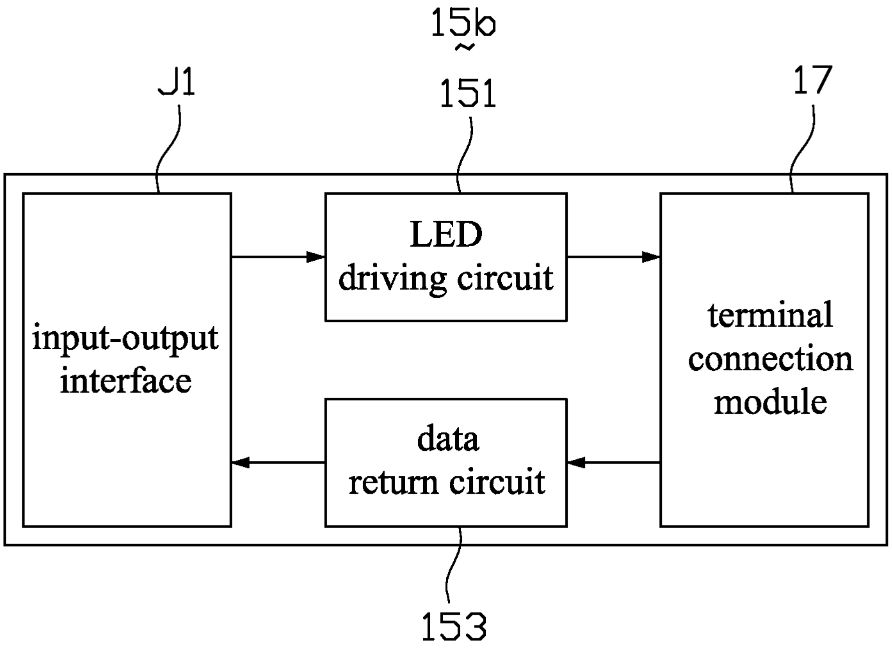
FIG. 5 is a schematic circuit block diagram of another embodiment of the last stage LED display unit board of a LED display unit board string as shown in FIG. 1.

It is noted that, in the embodiment as shown in FIGS. 3A, 3B and 4, the terminal connection module 17 is set independent from the LED display unit board 15*a* (15*b*), but the terminal connection module 17 can also be directly formed on the last stage LED display unit board such as the LED display unit board 15*b* instead, for example the schematic circuit block diagram of the LED display unit board 15*b* as shown in FIG. 5. Specifically, a difference between the LED display unit board 15*b* as shown in FIG. 5 from the LED display unit board 15*b* as shown in FIG. 3A is that: instead of providing the input-output interface J3, the terminal connection module 17 is provided in FIG. 5. Therefore, the circuit structure of the LED display unit board 15*b* in FIG. 5 is not same as the preceding stage(s) LED display unit board(s) 15*a* connected with the LED display unit board 15*b* in cascade. More specifically, as shown in FIG. 5, the LED display unit board 15*b* includes the input-output interface J1, the LED driving circuit 151, the data return circuit 153 and the terminal connection module 17. The LED driving circuit 151 is electrically connected between the input-output interface J1 and the terminal connection module 17, and is used to drive and control LEDs of the plurality of the LED pixels of the LED display unit board 15*b* to be illuminated or not according to the control signal and display data belonging to the LED display unit board 15*b* which are inputted from the input-output interface J1. The LED driving circuit 151 supports the fault detection mode, when the LED display screen control card 11 enables the LED driving circuit 151 to perform spot checking on a plurality of LEDs of the LED pixels driven and controlled by the LED driving circuit 151, the LED driving circuit 151 drives and controls the LEDs according to the display data used for the fault detection and received from the LED display screen control card 11, and outputs the return data representing the test result of the LEDs to the terminal connection module 17. The return data will be transmitted to the data return circuit 153 by the terminal connection module 17, and then data return circuit 153 transmits the return data to the LED display screen control card 11 through the input-output interface J1 for analyzing as to whether the LED display unit board 15*b* has one or more bad LED(s) and obtain the position of the one or more bad LED(s). Correspondingly, as for the terminal connection module 17, which may not have to be formed with the input-output interface 170 of FIG. 4, but may be directly electrically connected to the LED driving circuit 151 and the data return circuit 153 individually. In this embodiment, the data return circuit 172 may be a driver chip (such as 74HC245 chip, etc.) for signal enhancement, or a discrete component circuit, or a connection line(s).

Furthermore, it is noted that, the above-described embodiments of the present invention use the fault point detection (also refer to as spot checking) of LED display unit board as an example of fault detection, but the present invention is not limited to the aforementioned fault point detection technique, and also may be applied or adapted to ribbon cable detection, driver chip failure detection, and so on. If the ribbon cable detection is taken as an example, when the LED display screen control card 11 controls the LED display unit boards 15*a*, 15*b* to perform the ribbon cable detection, the LED display screen control card 11 sends data for fault detection to the LED display unit boards 15*a*, 15*b*. After the LED display screen control card 11 receives test result data transmitted back by the data return circuits 153 of the LED display unit boards 15*a*, 15*b*, received test result data is compared with the sent data for fault detection. If the comparison result indicates that they are the same, which represents the ribbon cable is normal (or operating properly); however, if they are different from each other, which represents means that the ribbon cable is defective or abnormally operating and needed to be repaired. In addition, a process of driver chip failure detection is substantially the same as the process of ribbon cable detection, and thus will not be repeated herein.

Figure 6:
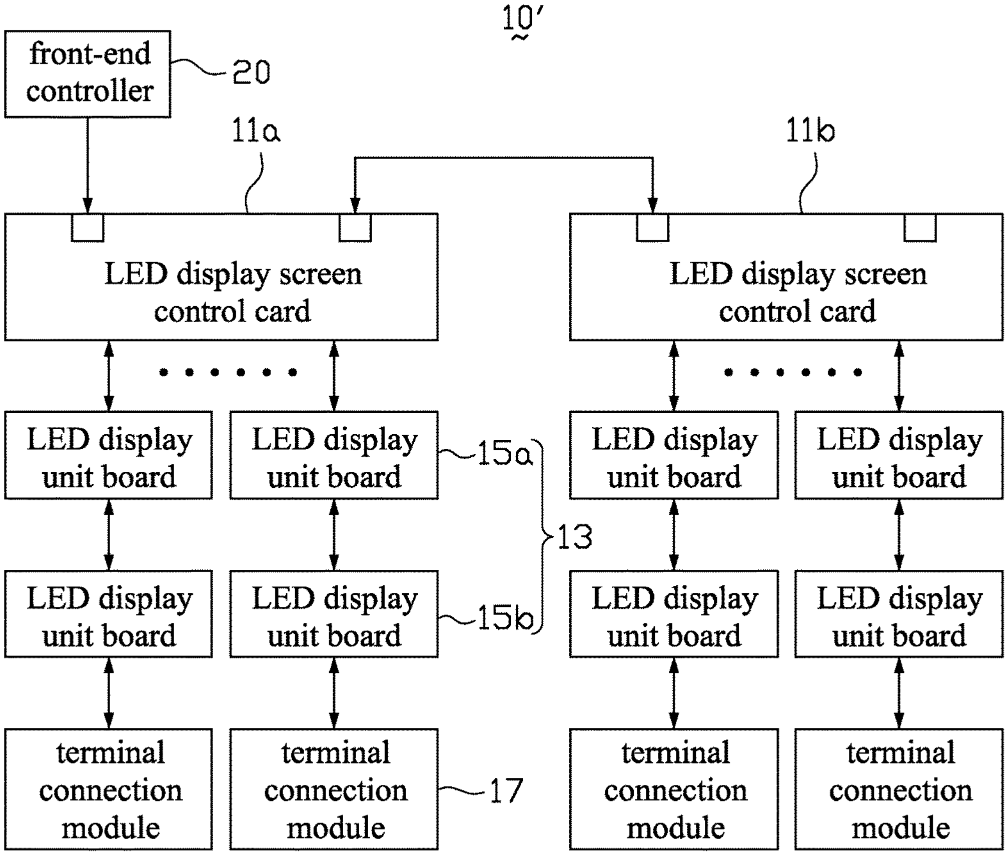
FIG. 6 is a schematic view of architecture of a LED display screen system of another embodiment of the present invention.

In addition, in other embodiment, as shown in FIG. 6, a LED display screen system 10' according to an exemplary embodiment of the present invention includes a plurality of LED display screen control cards. FIG. 6 only shows two LED display screen control cards 11*a*, 11*b* for the purpose of illustration. The LED display screen control cards 11*a*, 11*b* may have a circuit configuration which is basically the same with that of the LED display screen control card 11 as shown in FIG. 2. The LED display screen control cards 11*a*, 11*b* each are provided with communication interfaces such as gigabit Ethernet interfaces. The LED display screen control cards 11*a*, 11*b* are connected in cascade via the communication interfaces, so that display data and control signals required by the succeeding LED display screen control card 11*b* are delivered through the preceding stage LED display screen control card 11*a*. In this embodiment, the communication interfaces may receive display content data and control signals such as a clock signal, synchronization signals, etc. from a front-end controller 20 and uploads return data provided from the LED display unit board strings 13 driven by the LED display screen control cards 11*a*, 11*b* to the front-end controller 20 after the return data being processed. The display content data provided by the front-end controller 20, for example, is used to drive a LED display screen spliced by the LED display unit board strings 13 to display text, picture, time and so on. Furthermore, the LED display screen control cards 11*a*, 11*b* of the LED display screen system 10' as shown in FIG. 6 are not limited to having the same circuit configuration, and may have different configurations instead, such as illustrated in FIG. 8.

Figure 8:
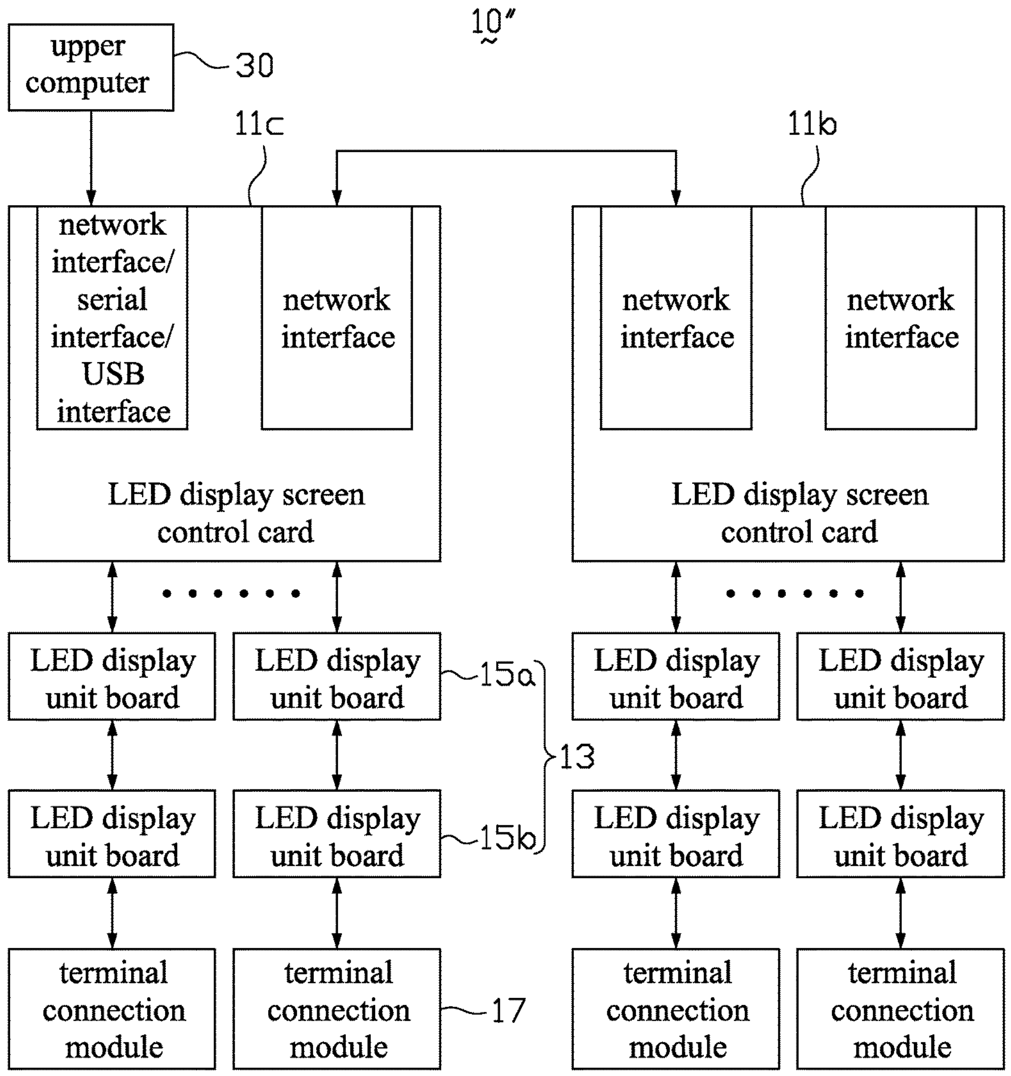
FIG. 8 is a schematic view of architecture a LED display screen system of still another embodiment of the present invention.

Specifically, as shown in FIG. 8, the LED display screen system 10" includes a LED display screen control card 11*c*, a LED display screen control card 11*b*, and a plurality of LED display unit board strings 13 driven by the LED display screen control cards 11*c*, 11*b*. A circuit configuration of the LED display screen control card 11*c* is different from that of the LED display screen control card 11*b*, and the LED display screen control card 11*c* integrates the functions of the LED display screen control card 11*a* and the front-end controller 20 as shown in FIG. 6 therein. Accordingly, the LED display screen control card 11*c* is an asynchronous control card, which can generate display content data and necessary control signals after processing display content inputted from an upper computer 30 through a network interface, a serial interface and a USB interface of itself, and then output display data and control signals after performing data conversion and gray scale control to drive and control the LED display unit board strings 13. In addition, the LED display screen control card 11*c* not only can directly drive the LED display unit board strings 13, but also can drive other LED display unit board string(s) 13 of the LED display screen through being connected with one or more LED display screen control card(s) 11*b* in cascade configuration.

In summary, the various embodiments of the present invention dispose the data return circuit on the LED display screen control card which can be used with a LED display unit board(s) having a data return circuit together, so that there is no need of having additional monitoring board for building a circuit loop to complete the fault detection of the LED display unit boards of the LED display screen, the connection is simplified and the cost is reduced. In addition, the LED display screen system of each embodiment of the present invention can be applied to the traffic field, but the invention is not limited thereto.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

INDUSTRIAL APPLICABILITY

Embodiments of the present invention dispose a data return circuit on the LED display screen control card which can be used with a LED display unit board(s) having a data return circuit, so that there is no need of the additional monitoring board for building a circuit loop to complete the fault detection of LED display unit boards of the LED display screen, the connection is simplified and the cost is reduced.

What is claimed is:

1. A LED display unit board, comprising:

a circuit board;

a plurality of LED pixels disposed on the circuit board, a first input-output interface, disposed on the circuit board;

a LED driving circuit, disposed on the circuit board and electrically connected to the first input-output interface to receive display data signals and control signals to thereby drive and control the plurality of LED pixels and generate a return data representing a test result of the LED display unit board according to the display data signals, wherein the return data representing the test result of the LED display unit board detects bad LED in the form of electrical discontinuity; and a data return circuit, disposed on the circuit board and electrically connected to the first input-output interface for enhancement of the return data and transmitting the return data to the first input-output interface, wherein the enhancement of the return data is provided by a driver chip producing signal enhancement;

a second input-output interface disposed on the circuit board, wherein the LED driving circuit is electrically connected between the first input-output interface and the second input-output interface, and the data return circuit is electrically connected between the first input-output interface and the second input-output interface;

wherein the LED display unit board is operative with another LED display unit board and a terminal connection module, the another LED display unit board is electrically connected between the second input-output interface and the terminal connection module, the return data generated by the LED driving circuit is transmitted to the another LED display unit board and the terminal connection module sequentially and then is transmitted to the data return circuit from the terminal connection module sequentially through the another LED display unit board and the second input-output interface; the another LED display unit board at least comprises circuit structures same as the first input-output interface, the LED driving circuit and the data return circuit.

2. A LED display screen control card adapted for driving a LED light display unit board string, wherein the LED display unit board string comprises a plurality of LED display unit boards connected in cascade; the LED display screen control card comprising:

a main control circuit;

an input-output interface, adapted for being electrically connected to the LED display unit board string, wherein the plurality of LED display unit boards comprises a last stage LED display unit board of the LED display unit board string and a preceding stage LED display unit board electrically connected between the input-output interface and the last stage LED display unit board, the last stage LED display unit board is adapted to electrically connect with a terminal connection module;

an output circuit, electrically connected between the main control circuit and the input-output interface and configured to transmit data and control signals provided by the main control circuit to the input-output interface to thereby drive and control the plurality of LED display unit boards of the LED display unit board string;

a data return circuit, electrically connected between the main control circuit and the input-output interface and configured to receive and enhance a return data generated by the plurality of LED display unit boards of the LED display unit board string from the input-output interface and then transmit the return data to the main control circuit, wherein the return data represents a test result of the LED display unit board string comprising a test result of the preceding stage LED display unit board and a test result of the last stage LED display unit board and thereby the return data representing the test result of the preceding stage LED display unit board firstly is transmitted from the preceding stage LED display unit board to the last stage LED display unit board and the terminal connection module sequentially and then is transmitted to the data return circuit from the terminal connection module sequentially through the last stage LED display unit board, the preceding stage LED display unit board and the input-output interface, wherein the enhancement of the return data is provided by a driver chip producing signal enhancement;

wherein the LED display screen control card further comprises a first communication interface and a second communication interface; the first communication interface is configured for electrically connecting with a control device, the second communication interface is configured for connecting with another LED display screen control card in cascade manner.

3. The LED display screen control card according to claim 2, wherein the main control circuit comprises a programmable logic device or an embedded microprocessor.

4. The LED display screen control card according to claim 2, wherein the input-output interface is a ribbon cable interface and thus adapted for being connected with the LED display unit board string through a ribbon cable.

5. A LED display screen system comprising:

a LED display screen control card;

a plurality of LED display unit board strings, being electrically connected to the LED display screen control card and each of the LED display unit board strings comprising a plurality of LED display unit boards, wherein the LED display unit board strings are directly connected to the LED display screen control card in parallel, respectively, and the LED display unit boards of each of the LED display unit board strings are directly connected in cascade, the plurality of LED display unit boards comprises a last stage LED display unit board of the LED display unit board string and a preceding stage LED display unit board electrically connected between the LED display screen control card and the last stage LED display unit board; and a terminal connection module, comprising a terminal input-output interface and a terminal data return circuit electrically connected to the terminal input-output interface, the terminal data return circuit is used to receive return data representing a test result of the LED display unit board string from the terminal input-output interface and transmit the return data back to the terminal input-output interface, the terminal connection module being electrically connected to the last stage LED display unit board of the LED display unit board string and configured to make the return data be returned to the LED display unit board string through the terminal connection module and then be transmitted to the LED display screen control card, wherein the return data are generated by the LED display unit board string, the test result of the LED display unit board string represented by the return data comprises a test result of the preceding stage LED display unit board and a test result of the last stage LED display unit board and thereby the return data representing the test result of the preceding stage LED display unit board firstly is transmitted from the preceding stage LED display unit board to the last stage LED display unit board and the terminal connection module sequentially and then is transmitted to the LED display screen control card from the terminal connection module sequentially through the last stage LED display unit board and the preceding stage LED display unit board, wherein the return data representing the test result of the LED display unit board detects bad LED in the form of electrical discontinuity, wherein, the last stage LED display unit board, the preceding stage LED display unit board and terminal connection module are used for receiving and enhancement the return data, the enhancement of the return data is provided by a driver chip producing signal enhancement.

6. The LED display screen system according to claim 5, wherein the LED display screen control card comprises a main control circuit, an output circuit, a data return circuit and an input-output interface; the input-output interface is electrically connected to the LED display unit board string, the output circuit is electrically connected between the main control circuit and the input-output interface, the data return circuit is electrically connected between the main control circuit and the input-output interface and configured to receive the return data.

7. The LED display screen system according to claim 6, wherein the input-output interface of the LED display screen control card is a ribbon cable interface.

8. The LED display screen system according to claim 6, wherein the last stage LED display unit board comprises:

a circuit board;

a plurality of LED pixels, disposed on the circuit board;

a first input-output interface, disposed on the circuit board and electrically connected to the input-output interface of the LED display screen control card;

a LED driving circuit, disposed on the circuit board, electrically connected to the first input-output interface of the LED display screen control card, and configured to drive and control the plurality of LED pixels and output the return data representing the test result of the LED display unit board string; and a data return circuit, configured to form a loop with the LED driving circuit through the terminal connection module to thereby receive the return data representing the test result of the LED display unit board string returned through the terminal connection module.

9. The LED display screen system according to claim 8, wherein the terminal connection module is directly formed on the circuit board and electrically connected with both the LED driving circuit and the data return circuit.

10. The LED display screen system according to claim 8, wherein the LED display screen control card is configured for enabling the LED driving circuit to perform spot checking on LEDs of the plurality of LED pixels driven by the LED driving circuit, the LED driving circuit drives the LEDs according to display data used for fault detection and received from the LED display screen control card and outputs the return data representing the test result of the last stage LED display unit board to the terminal connection module; the return data representing the test result of the last stage LED display unit board then is transmitted to the data return circuit from the terminal connection module and finally to the LED display screen control card for analyzing whether the last stage LED display unit board has one or more bad LED(s) and obtaining a position(s) of the one or more bad LED(s).

* * * * *